(12) United States Patent
Nunan et al.

(10) Patent No.: US 11,161,098 B2
(45) Date of Patent: Nov. 2, 2021

(54) THREE-WAY CATALYST

(71) Applicant: UMICORE AG & CO. KG, Hanau-Wolfgang (DE)

(72) Inventors: John Nunan, Tulsa, OK (US); Ryan J. Andersen, Owasso, OK (US); Curt M. Ellis, Bixby, OK (US); John Kraus, Tulsa, OK (US); Marcus Williams, Broken Arrow, OK (US); Deven Ross, Bloomfield Hills, MI (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 266 days.

(21) Appl. No.: 15/983,227

(22) Filed: May 18, 2018

(65) Prior Publication Data
US 2019/0351394 A1 Nov. 21, 2019

(51) Int. Cl.
*B01J 21/04* (2006.01)
*B01J 21/06* (2006.01)
(Continued)

(52) U.S. Cl.
CPC .......... *B01J 23/464* (2013.01); *B01D 53/945* (2013.01); *B01D 53/9468* (2013.01);
(Continued)

(58) Field of Classification Search
CPC . B01J 21/04; B01J 21/06; B01J 21/063; B01J 21/066; B01J 21/08; B01J 21/10; B01J 21/12; B01J 21/14; B01J 23/002; B01J 23/10; B01J 23/12; B01J 23/44; B01J 23/464; B01J 23/56; B01J 35/0006;
(Continued)

(56) References Cited

U.S. PATENT DOCUMENTS

| 6,375,910 B1 * | 4/2002 | Deeba ............... F01N 3/0814 |
| | | 423/239.1 |
| 7,189,376 B2 * | 3/2007 | Kumar ............. F01N 13/0097 |
| | | 422/177 |

(Continued)

OTHER PUBLICATIONS

SAE International J. Engines 2016-01-0925 (vol. 9, Issue 2), Jun. 2016 "Low Cost LEV-III, Tier-III Emission Solutions with Particulate Control Advanced Catalysts and Substrates". Angus Craig, et al.
(Continued)

*Primary Examiner* — Cam N. Nguyen
(74) *Attorney, Agent, or Firm* — Smith, Gambrell & Russell, LLP

(57) ABSTRACT

The present invention relates to a catalyst comprising a carrier substrate of the length L extending between substrate ends a and b and two washcoat zones A and B, wherein washcoat zone A comprises a first platinum group metal and extends starting from substrate end a over a part of the length L, and washcoat zone B comprises the same components as washcoat zone A and in addition a second platinum group metal and extends from substrate end b over a part of the length L, wherein $L=L_A+L_B$, wherein $L_A$ is the length of washcoat zone A and $L_B$ is the length of substrate length B.

21 Claims, 3 Drawing Sheets

(51) Int. Cl.

| | | |
|---|---|---|
| B01J 21/08 | (2006.01) | |
| B01J 21/10 | (2006.01) | |
| B01J 21/12 | (2006.01) | |
| B01J 21/14 | (2006.01) | |
| B01J 23/00 | (2006.01) | |
| B01J 23/10 | (2006.01) | |
| B01J 23/12 | (2006.01) | |
| B01J 23/44 | (2006.01) | |
| B01J 23/46 | (2006.01) | |
| B01J 23/56 | (2006.01) | |
| B01J 35/00 | (2006.01) | |
| B01J 35/04 | (2006.01) | |
| F01N 13/00 | (2010.01) | |
| F01N 3/28 | (2006.01) | |
| B01D 53/94 | (2006.01) | |
| B01J 37/02 | (2006.01) | |
| F01N 3/10 | (2006.01) | |

(52) U.S. Cl.
CPC ..... *B01D 53/9472* (2013.01); *B01D 53/9477* (2013.01); *B01J 21/04* (2013.01); *B01J 23/44* (2013.01); *B01J 35/0006* (2013.01); *B01J 35/04* (2013.01); *B01J 37/0228* (2013.01); *B01J 37/0244* (2013.01); *F01N 3/28* (2013.01); *F01N 13/0093* (2014.06); *B01D 2255/1023* (2013.01); *B01D 2255/1025* (2013.01); *B01D 2255/9022* (2013.01); *B01D 2255/9032* (2013.01); *F01N 3/101* (2013.01); *F01N 2510/0682* (2013.01)

(58) Field of Classification Search
CPC ........ B01J 35/04; F01N 13/0093; F01N 3/28; B01D 53/945; B01D 53/9468; B01D 53/9472; B01D 53/9477
See application file for complete search history.

(56) References Cited

U.S. PATENT DOCUMENTS

| | | | | |
|---|---|---|---|---|
| 7,375,056 B2 * | 5/2008 | Wei | ...................... | B01J 35/0006 502/439 |
| 7,524,465 B2 * | 4/2009 | Kumar | .................... | B01J 35/04 422/180 |
| 7,534,738 B2 * | 5/2009 | Fujdala | ................ | B01J 35/0006 502/74 |
| 7,722,829 B2 * | 5/2010 | Punke | .................... | B01J 35/04 422/180 |
| 7,745,367 B2 * | 6/2010 | Fujdala | ................ | B01J 37/0244 502/60 |
| 7,998,424 B2 * | 8/2011 | Bergeal | ................ | B01D 53/945 422/180 |
| 8,066,963 B2 * | 11/2011 | Klingmann | .......... | B01D 53/945 423/213.5 |
| 8,263,033 B2 * | 9/2012 | Dobson | .............. | B01D 53/9472 422/177 |
| 8,637,426 B2 * | 1/2014 | Hoke | ................... | B01D 53/945 502/339 |
| 8,640,440 B2 * | 2/2014 | Klingmann | .............. | B01J 35/04 60/274 |
| 8,667,785 B2 * | 3/2014 | Blakeman | ................ | B01J 33/00 60/299 |
| 8,796,617 B2 * | 8/2014 | Hofstadler | ......... | G01R 31/2812 250/288 |
| 8,802,016 B2 * | 8/2014 | Grubert | ................ | B01D 53/944 422/177 |
| 9,259,684 B2 * | 2/2016 | Blakeman | ........... | B01J 37/0215 |
| 9,273,583 B2 * | 3/2016 | Bergeal | ...................... | B01J 23/48 |
| 9,333,461 B2 * | 5/2016 | Castagnola | .............. | B01J 23/52 |
| 9,333,490 B2 * | 5/2016 | Kazi | ........................ | B01J 23/44 |
| 9,352,279 B2 * | 5/2016 | Greenwell | ............... | B01J 35/10 |
| 9,527,034 B2 * | 12/2016 | Bergeal | ................ | B01D 53/945 |
| 9,579,638 B2 * | 2/2017 | Fedeyko | ............. | B01J 37/0244 |
| 9,597,661 B2 * | 3/2017 | Blakeman | ................ | B01J 35/04 |
| 9,604,175 B2 * | 3/2017 | Hatfield | .................... | B01J 35/04 |
| 9,611,773 B2 * | 4/2017 | Brown | .............. | B01D 53/9422 |
| 9,636,634 B2 * | 5/2017 | Chiffey | ................ | B01J 35/0006 |
| 9,643,160 B2 * | 5/2017 | Chiffey | ................. | F01N 3/2026 |
| 9,643,161 B2 * | 5/2017 | Chiffey | ................ | B01J 37/0244 |
| 10,010,873 B2 * | 7/2018 | Aoki | ......................... | F01N 3/10 |
| 10,183,253 B2 * | 1/2019 | Onoe | .................... | B01J 23/44 |
| 10,201,805 B2 * | 2/2019 | Ohashi | .............. | B01D 53/9454 |
| 10,207,254 B2 * | 2/2019 | Blakeman | ........... | B01J 37/0244 |
| 10,213,741 B2 * | 2/2019 | Sato | ...................... | B01J 37/0244 |
| 10,286,359 B2 * | 5/2019 | Chiffey | ..................... | B01J 29/40 |
| 10,328,388 B2 * | 6/2019 | Dumbuya | ........... | B01D 53/944 |
| 10,357,744 B2 * | 7/2019 | Ohashi | ................ | B01J 35/0006 |
| 10,376,838 B2 * | 8/2019 | Andersen | ............. | B01D 53/944 |
| 10,569,257 B2 * | 2/2020 | Chiffey | ..................... | B01J 23/63 |
| 10,625,208 B2 * | 4/2020 | Bergeal | ............... | B01J 35/0006 |
| 10,626,765 B2 * | 4/2020 | Inoda | ................. | B01J 35/0006 |
| 10,669,910 B2 * | 6/2020 | Chen | .................. | B01D 53/9418 |
| 10,688,475 B2 * | 6/2020 | Blakeman | ............ | B01J 29/7615 |
| 10,807,040 B2 * | 10/2020 | Chen | ................. | B01D 53/9436 |
| 10,828,603 B2 * | 11/2020 | Chen | ................. | B01D 53/9468 |
| 2013/0150236 A1 * | 6/2013 | Aoki | ................... | B01J 35/0006 502/303 |
| 2014/0186244 A1 * | 7/2014 | Blakeman | ................ | B01J 35/04 423/213.5 |
| 2015/0375206 A1 * | 12/2015 | Aoki | ...................... | B01J 23/464 502/303 |
| 2016/0045867 A1 * | 2/2016 | Kearl | ................... | B01J 35/0013 423/213.2 |
| 2016/0258330 A1 * | 9/2016 | Yamada | .................... | B01J 35/02 |
| 2017/0128922 A1 | 5/2017 | Chen et al. | | |
| 2017/0296969 A1 * | 10/2017 | Ohashi | .............. | B01D 53/9454 |
| 2017/0312690 A1 * | 11/2017 | Sato | .................... | B01J 35/0006 |
| 2017/0312691 A1 * | 11/2017 | Sato | .................... | B01J 35/0006 |
| 2018/0257062 A1 * | 9/2018 | Chiffey | ............... | B01J 37/0244 |
| 2018/0264409 A1 * | 9/2018 | Suzuki | ..................... | B01J 37/03 |
| 2018/0280878 A1 * | 10/2018 | Inoda | .................... | B01J 23/464 |
| 2018/0353902 A1 * | 12/2018 | Chiffey | ............... | B01J 37/0228 |
| 2018/0353903 A1 * | 12/2018 | Chiffey | .................... | B01J 23/02 |
| 2019/0240643 A1 * | 8/2019 | Karpov | .................. | B01J 35/023 |
| 2019/0255485 A1 * | 8/2019 | Bergeal | ............. | B01D 53/9472 |

OTHER PUBLICATIONS

DIN 66132:Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).

International Search Report dated Sep. 11, 2019 for International Patent Application No. PCT/EP2019/062622 (4 pages).

Written Opinion of the International Searching Authority dated Sep. 11, 2019 for International Patent Application No. PCT/EP2019/062622 (7 pages).

* cited by examiner

THREE-WAY CATALYST

The present invention relates to a three-way catalyst (TWC) for treatment of exhaust gases of combustion engines operated with a predominantly stoichiometric air/fuel ratio.

It is well known in the field of combustion engines that fuel combustion is not complete and as a result gives emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, the implementation of active strategies such as improved combustion and optimized A/F or lambda control have been carried out in an effort to decrease the emission of pollutants. Improvement of fuel-air mixing (A/F ratio) as primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and $NO_x$. Such catalysts comprise as catalytically active material one or more platinum group metals, in particular platinum, palladium and/or rhodium.

Optimal use of the TWC is around Lambda=1+/−0.005 where the air/fuel ratio is equal to 14.56. Above these values, the exhaust gas is said to be lean and contains an excess of oxidants such as $O_2$ and NOx, and CO and HC are catalytically oxidized to carbon dioxide and water. Below this value, the exhaust gas is said to be rich and contains an excess of reductants such as $H_2$, CO and HCs and mainly $NO_x$ is reduced to nitrogen using e.g. CO as a reducing agent.

Optimal conversion of HC, CO and $NO_x$ is achieved at Lambda=1.

However, gasoline engines operate under oscillating conditions between slightly lean and slightly rich conditions. In order to broaden the optimal operation of a TWC, oxygen storage component (OSCs) in the form of cerium-zirconium mixed oxides were included in its formulation.

Highly concentrated platinum group metals (PGMs) like platinum, palladium and rhodium, can give significant performance improvements in many exhaust after-treatment applications. Thus in the case of palladium the light-off performance can improve by 100° C. (measured as temperature for 50% conversion) in going from low palladium loads of 20 g/ft$^3$ (0.7 g/l) to high loadings of 100 g/ft$^3$ (3.5 g/l) after moderate to severe aging. Performance does improve above these loadings but the performance gradient with respect to palladium loading is low and very high palladium loads are required for an appreciable impact. The same general trend is expected for rhodium in TWC applications.

However, high concentrations of platinum group metals in three-way conversion catalysts are not favored because of the their high cost. This drawback can be partially overcome by their strategic placement for example in small size monoliths with high cell density located close to the engine manifold. These strategies take advantage of hotter exhaust gas temperatures that shorten the time for cold start as the monolith heats faster and the lower mass coupled with high cell density takes advantage of lower thermal inertia coupled with faster heat transfer to the close coupled (CC) monolith.

A further strategy for improved light-off and for lowering platinum group metal cost is to selectively locate it on a small section of the monolith, often less than 10% of the monolith volume where it has the greatest benefit.

This allows us to concentrate the platinum group metal while not using a large quantity of it as it is strategically located on a small volume section of the monolith.

It is known in the literature that highly concentrated and short zones of platinum group metals when applied to the substrate inlet give improved cold start performance due to improved light-off, especially for hydrocarbon (HC) as high concentrations of HC are emitted when the engine is cool and combustion is incomplete. However, the close coupled monolith can be exposed to a variety of contaminants that remain in place over the lifetime of the vehicle. These include the break-down or partially combusted components in engine oil and include calcium, phosphorous, zinc and boron. These poisons are not deposited uniformly over the length of the monolith but are deposited preferentially towards the inlet of the catalyst and their loading drops off rapidly as we progress towards the monolith outlet. The fall-off in loading can be exponential in nature such that the front one to two inches of the monolith can have very high loadings of these components. Depending on how the poisons enter the exhaust two different types of poisoning modes are observed. If the poisons leak into the vehicle combustion chamber the resultant phosphorous and zinc penetrates the washcoat located on the monolith and reacts with its components such as cerium, aluminum and other components. It is believed for example that phosphorous forms phosphoric acid in this poisoning mechanic and is reactive to such an extent that the normally structurally stable Ce—Zr mixed oxides are broken down to give new compounds. In extreme cases the cerium can be extracted from the Ce—Zr mixed oxides to give $CePO_4$ which results in a loss of OSC performance. In a second mechanism the engine oil can leak directly into the exhaust after it exits the combustion cylinders. In this case the oil is deposited directly onto the monolith washcoat and decomposes to give zinc pyrophosphate on the surface. If high levels are deposited via this mechanism a surface "glaze" or impermeable barrier on the washcoat surface is formed such that exhaust gas molecules are unable to diffuse to the active platinum group metal component within the washcoat. This is often referred to as masking and is commonly observed for severely oil poisoned TWC catalysts. A consequence of this type poisoning is that selective placement of the platinum group metal band or zone towards the inlet face of the monolith would be counter production as a high fraction of the expensive platinum group metal is not available for catalysts. It is anticipated that this type of poisoning will be more common in the future as the industry moves to more efficient vehicles deigned to meet the new CAFÉ fuel economy standards. This arises as one solution to improved fuel economy is to use hotter and smaller engines that operate at higher RPMs. This approach results in greater engine wear and the degree of poisoning by engine oil is expected to increase with the introduction of these high fuel economy vehicles. Other poisoning mechanisms that selectively target the inlet region of the monolith include washcoat erosion and physical blockage and coating of the washcoat if the inlet face is impacted with particulate matter such as rust originating from the manifold region. In some regions of the world such as China the inclusion of the octane booster Methyl-cyclo-pentadienyl manganese tri-carbonyl (MMT) can decompose on the inlet monolith region to give a layer of $Mn_3O_4$ which again can act as a physical masking or blocking reagent for exhaust gases that must penetrate to the washcoat for catalysis to occur.

The inventors of the present invention discussed whether the above disadvantages of zoning or banding the inlet region of the monolith with high platinum group metal concentrations can be overcome by locating the high platinum group metal band or zone sufficiently away or back from the inlet region of the monolith such that the above poisoning and deactivation mechanisms are minimized while still achieving the advantage of improved light off and subsequent shorter cold start periods on the vehicle. While it may not be feasible to place the zone within the substrate internal volume away from both inlet and outlet regions, it might be possible to get advantages for zoning the outlet of the first close coupled catalyst. In modern applications the monolith size has been reduced considerably and the cell density increased. The use of small high cell density substrates is now the norm with 600 cpsi/2 mill, 750 cpsi/2 mill and 900 cpsi/2 mill substrates being the standard for the first close coupled catalyst (CC-1). A further reason for smaller volume substrates is the limitations in space close to the manifold position of the vehicle.

The inventors finally made the unexpected observation that zoning the outlet of the CC-1 monolith leads to measurable performance advantages as compared to zoning the inlet or using a homogeneous platinum group metal distribution across the full volume of the monolith. Part of the explanation may arise from the selective poisoning of the inlet as described above coupled with the special characteristics (smaller volumes, shorter parts, lower mass and higher cell density) of current CC-1 monoliths.

Accordingly, the present invention pertains to a catalyst comprising a carrier substrate of the length L extending between substrate ends a and b and two washcoat zones A and B, wherein washcoat zone A comprises a first platinum group metal and extends starting from substrate end a over a part of the length L, and washcoat zone B comprises the same components as washcoat zone A and in addition a second platinum group metal and extends from substrate end b over a part of the length L, wherein $L=L_A+L_B$, wherein $L_A$ is the length of washcoat zone A and $L_B$ is the length of substrate length B.

Accordingly, according to the present invention the first platinum group metal is distributed uniformly through the full length L of the carrier substrate, whereas the second platinum group metal is present in washcoat zone B only.

Consequently, the total amount of platinum group metal in washcoat zone B is higher than the total amount of platinum group metal in washcoat zone A.

First and second platinum group metals can be the same or can be different. For example, the first platinum group metal is platinum, palladium and/or rhodium and the second platinum group metal is palladium or rhodium. Preferably, the first platinum group metal is palladium and rhodium and the second platinum group metal is palladium or the first platinum group metal is palladium and rhodium and the second platinum group metal is rhodium.

In case first and second platinum group metal are both the same, for example palladium, washcoat zone B comprises a higher amount of that platinum group metal, for example palladium, than washcoat zone A.

In an embodiment of the present invention washcoat zone A comprises two layers A1 and A2, which both extend over the length $L_A$, wherein layer A1 comprises a first platinum group metal and layer A2 comprises a first platinum group metal different from the first platinum group metal of layer A1 and washcoat zone B comprises two layers B1 and B2, which both extend over the length $L_B$, wherein layer B1 comprises the same components as layer A1 and layer B2 comprises the same components as layer A2 and wherein layers B1 and B2 comprise in addition a second platinum group metal.

In embodiments of the present invention layer A1 comprises palladium or comprises palladium and one or more additional platinum group metals, in particular platinum and rhodium, preferably rhodium.

Preferably, the first platinum group metal in layer A1 is palladium and the first platinum group metal in layer A2 is rhodium. In that case the weight ratio Pd:Rh is for example 10:1 to 1:10.

In embodiments of the present invention layer A2 comprises rhodium or comprises rhodium and one or more additional platinum group metals, in particular platinum and palladium, preferably palladium. In the latter case the weight ratio Pd:Rh is for example 10:1 to 1:10.

In preferred embodiments of the present invention washcoat zones A and B are, apart from the presence of the second platinum group metal in washcoat zone B, identical.

Likewise, layers A1 and B1 are, apart from the presence of the second platinum group metal in layer B1, identical and layers A2 and B2 are, apart from second platinum group metal in layer B2, identical.

Preferably, first and second platinum group metals are independently from each other supported on a carrier material.

As carrier material all materials can be used which are known to the skilled person for that purpose. Usually, they have a BET surface of 30 to 250 m2/g, preferably of 100 to 200 $m^2/g$ (determined according to German standard DIN 66132) and are in particular selected from the group consisting of alumina, silica, magnesia, titania, zirconia, ceria, mixtures comprising at least two of these materials and mixed oxides comprising at least two of these materials.

Preferred are alumina, alumina/silica mixed oxides, magnesia/alumina mixed oxides, ceria, ceria/zirconia mixed oxides and zeolites.

In case alumina is used, it is preferably stabilized, for example with 1 to 6 weight percent, in particular 4 weight percent, of lanthana.

The different platinum group metals can be supported on the same or on different support materials.

In case the platinum group metal in washcoat zone A and A1, respectively, comprises palladium, it is usually present in an amount of 0.04 to 4.0 g/l, based on the zone volume of the carrier substrate and calculated as palladium metal. The palladium content in washcoat zone B is higher than in washcoat zone A and is usually 2 to 20 g/l, based on the volume of the carrier substrate and calculated as palladium metal.

In case the platinum group metal in washcoat zone A and A1, respectively, comprises rhodium, it is usually present in an amount of 0.04 to 4.0 g/l, based on the zone volume of the carrier substrate and calculated as rhodium metal.

In embodiments of the present invention washcoat zone A extends over 70 to 95% of the length L of the carrier substrate, preferably 73 to 90% and washcoat zone B extends over 5 to 30% of the length L of the carrier substrate, preferably 10 to 27%.

In embodiments of the present invention the carrier substrate of the length L can be a flow through or a filter substrate. Such carrier substrates are usually made of cordierite or metal and are described in literature and available on the market.

The catalyst of the present invention can be manufactured by known methods, in particular by a two-step process which comprises coating of the carrier substrate with a coating suspension (washcoat) which contains the components of washcoat zone A over its entire length L and dipping the coated carrier substrate in a aqueous solution containing a water soluble compound of the second platinum group metal until a length which corresponds with the length of washcoat zone B, so as to form washcoat zone B.

The coating in the first step is usually performed via conventional immersion, suction and pumping methods which are extensively described in the literature and known to the person of skill in the art.

The water soluble compound of the second platinum group metal used in the second step, can be any stable platinum group metal salt inclusive of nitrates, acetates, chlorides, sulfites, amine complexes etc. Since wicking of a solvent such as water occurs after contact with the platinum group metal solution a surfactant or surface tension modifier usually needs to be added to control this phenomenon as without it the band length cannot be controlled. Avoiding wicking and uncontrolled band lengths can also be achieved by using solvents other than water such as alcohols (methanol or ethanol), other polar solvents such a tetra hydro furan (THF), esters etc. In fact, any solvent can be used that the platinum group metal salt is soluble in. Platinum group metal uptake is controlled based on the length of the band, volume of solution uptake and platinum group metal concentration of the solution. The preferred method of applying the band is a metered charge approach where all solution injected remains on the part throughout the part handling, drying and calcination. It is desirable that the solution does not interact chemically with the washcoat zone A on the monolith such that the washcoat components are dissolved and extracted. Since the application of the high concentration band is done after application of the washcoat zone A the process is very flexible and not technology specific with respect to washcoat composition or the number of washcoat passes.

The first and second step are usually followed by calcination and optionally thermal reduction in an atmosphere which contains forming gas.

The catalyst of the present invention is suitable for the treatment of exhaust gases of engines operated with a predominantly stoichiometric air/fuel ratio, the treatment of the exhaust gas being carried out by passing the exhaust gas over the inventive catalyst. In particular, it can be advantageously used in close coupled position, preferable as the first catalyst located directly after the exhaust manifold (so-called CC-1 position).

Accordingly, the present invention further relates to a method for treating the exhaust gas of an engine operated with a predominantly stoichiometric air/fuel ratio, characterized in that the exhaust gas is passed over an inventive catalyst wherein it enters the catalyst at substrate end a and exits it at substrate end b.

In a preferred embodiment of this method, the inventive catalyst is arranged in close coupled position in particular directly following the exhaust manifold.

The catalyst of the present invention can be combined with another three-way catalyst to form a three-way catalyst system.

For example, substrate end b of the catalyst of the present invention can be followed by an conventional three-way catalyst.

Also, substrate end b of the catalyst of the present invention can follow an conventional three-way catalyst.

As conventional three-way catalysts all three-way catalysts known to the skilled person and described in the literature can be used. Usually they comprise a platinum group metal, in particular palladium and rhodium, supported on a carrier material, as well as an oxygen storing component (OSC) which is in particular a cerium-zirconium mixed oxide.

DETAILED DESCRIPTION

Figure 1:
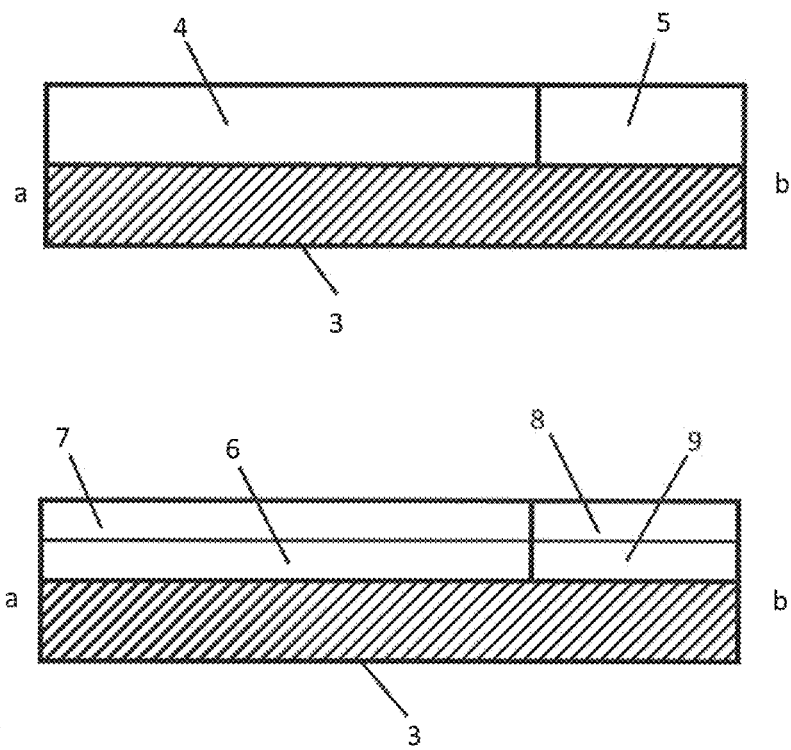
FIG. 1 illustrates catalysts according to the present invention.

FIG. 1 illustrates catalysts according to the present invention. The upper part of the figure shows a detail of an inventive catalyst (1) which comprises a carrier substrate (3) which extends between substrate ends a and b and which carries washcoat zone A (4) and washcoat zone B (5).

The lower part of the figure shows a detail of another embodiment of the invention. Catalyst (2) comprises a carrier substrate (3) which extends between substrate ends a and b. Washcoat zone A comprises layer A1 (6) and A2 (7) whereas washcoat zone B comprises layer B1 (9) and layer B2 (8). Layers A1 (6) and B1 (9) differ only in that B1 (9) comprises a second platinum group metal compared to A1 (6). Likewise, layers A2 (7) and B2 (8) differ only in that B2 (8) comprises a second platinum group metal compared to A2 (7).

Figure 2:
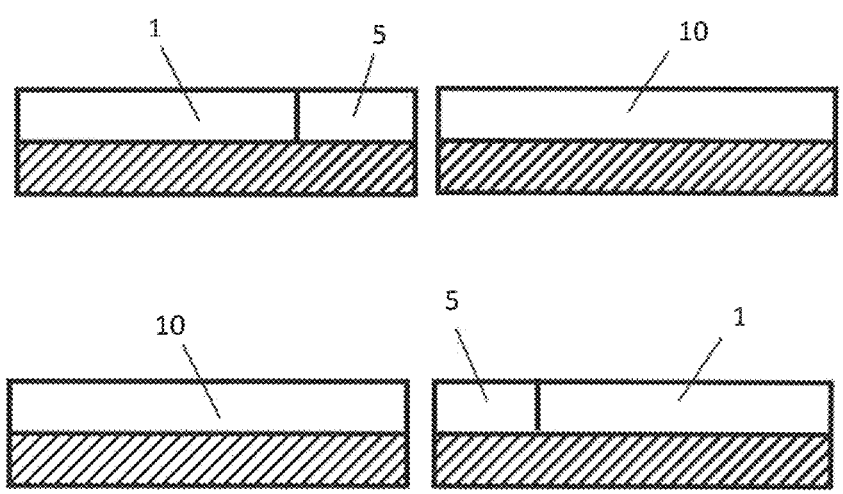
FIG. 2 illustrates catalyst systems according to the present invention.

FIG. 2 illustrates catalyst systems according to the present invention.

The upper part shows an inventive catalyst system (11) which comprises an inventive catalyst (1) and an conventional three-way catalyst (10). Both catalysts are arranged so that washcoat zone B (5) is followed by the conventional three-way catalyst (10).

The lower part shows an inventive catalyst system (12) which comprises an inventive catalyst (1) and an conventional three-way catalyst (10). Both catalysts are arranged so that washcoat zone B (5) follows the conventional three-way catalyst (10).

Comparison Example 1

Comparison Example 1 is a 2-Layer Pd/Rh technology that was prepared as follows:

a) For the 1st layer (Pd layer) a slurry was prepared by first adding nitric acid to water at 1 wt %. $BaSO_4$ was then added with stirring followed by the OSC material. The OSC material consisted of $CeO2=44$ wt %, $ZrO_2+HfO_2=42$ wt %, $La_2O_3=9.5$ wt % and $Pr_6O_{11}=4.5$ wt %. The slurry was stirred for 15 minutes and then alumina was added slowly. After stirring for 30 minutes, sucrose was added at 10 wt % based on solids and finally a dispersible boehmite binder was added. The slurry was then milled using a Sweco type mill to a mean particle size of greater than 2 micrometers, 90% of the diameter distribution was 6.0 to 7.0 micrometers and a 100% pass of less than 25 micrometers (i.e., 100% of the particles had a particle size less than 25 micrometers). The slurry was then weighed and the LOI (loss on ignition) measured at 540° C. to determine the total calcined solids content. Based on this value the Pd loading were calculated. Pd nitrate solution was then added to the slurry dropwise while stirring. After the Pd addition the slurry specific gravity was in the range of 1.49 to 1.52.

b) Coating was performed by dipping one end of a honeycomb ceramic monolith (commercially available flow through substrate made of cordierite (3.54"×5.16"×2.5"long; 900 cpsi/2 mill) into the washcoat slurry, followed by drawing the slurry up into the channels using a vacuum. The monolith was then removed from the slurry and the channels cleared by applying a vacuum to its other end. Washcoat loading was controlled by varying specific gravity, and other coating parameters such as vacuum time and the amount of slurry drawn into the honeycomb channels. After applying the washcoat, the monolith was calcined at 540° C. for 2 hours. The final WC loading on a dry calcined basis was alumina sol=3 g/L, stabilized alumina=52 g/L, $BaSO_4$=15 g/L and OSC=34 g/L giving a total loading for Layer 1=104 g/L. The layer was coated over the total length of the monolith.

c) This process was then repeated for the second layer (Rh layer) except that Rh was added instead of Pd. The final WC loading on a dry calcined based was alumina sol=3 g/L, stabilized alumna=34 g/L, $BaSO_4$=6 g/L and OSC=49 g/L giving a total loading for Layer 2=92 g/L. The second layer was as well coated over the total length of the monolith.

The resulting product was dried and calcined. The catalyst obtained is subsequently called CC1.

Example 1

CC1 obtained according to Comparison Example 1 was dipped into an aqueous solution of palladium nitrate in order to form a zone of 1.25" length comprising a total of 246 $g/ft^3$ (8.69 g/l) of palladium. The resulting product was dried and calcined. The catalyst obtained is subsequently called C1.

Figure 3:
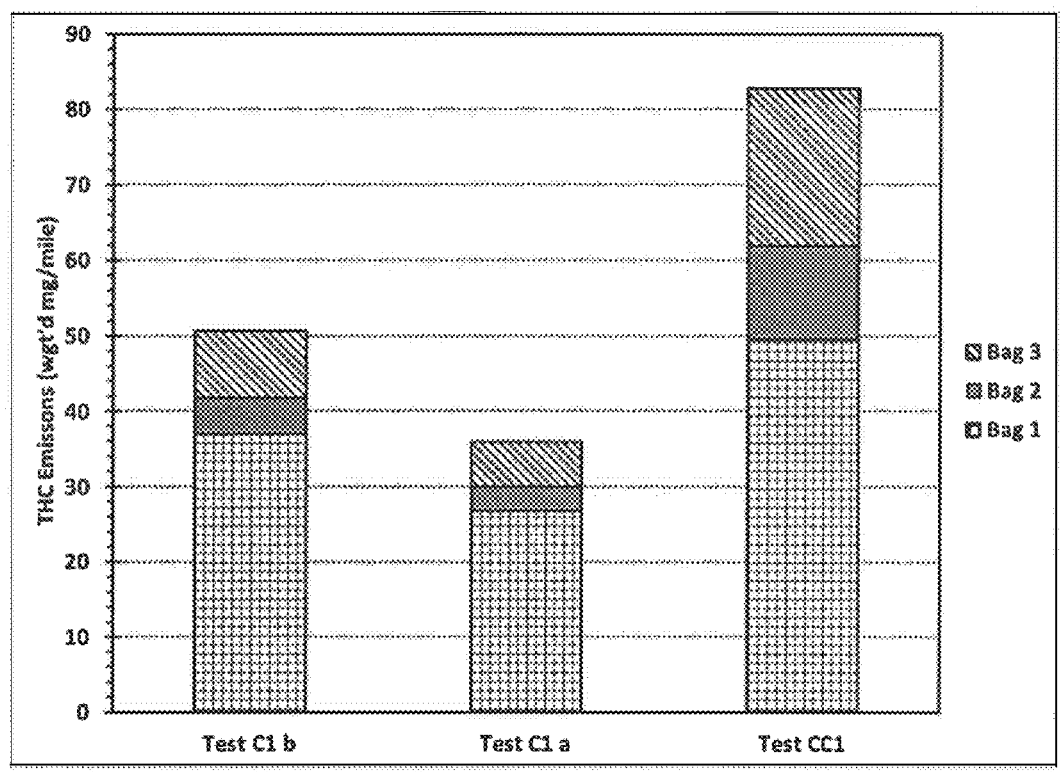
FIG. 3 shows the THC emissions (weighted mg/mile) obtained in the tests C1 a, C1 b and CC1, respectively.

Comparison of CC1 and C1 a) CC1 and C1 were engine-aged to a FUL (full useful life) 150K mile condition using a 4-mode aging cycle for 90 hours. Each 4-mode cycle lasts for 60 seconds and the aging cycle is repeated 4500 times. The first 50 hours of aging were done with a phosphorous doped fuel using the additive DMA4 as the dopant. The remaining 40 hours was thermal aging only. The individual modes are: stoichiometric, rich, rich+air-injection, and stoichiometric+air-injection. Peak temperatures measured in CC1 and C1 catalysts were ~990° C. A detailed description of the aging is given in the 2016 SAE World Congress Paper 2016-01-0925.

b) The aged catalyst C1 was tested in a vehicle testing using a Ford Escape 2.0 L (4×FTP/US06). The catalyst was arranged in close coupled position directly following the exhaust manifold. The exhaust gas entered the catalyst on substrate end a and left it on the side with the increased amount of palladium of 246 $g/ft^3$ (8.69 g/l) (substrate end b). The results of this test are given in FIG. 3 as "Test C1 a".

c) The test described in b) was repeated with the exception that the exhaust gas entered the catalyst on the side with the increased amount of palladium of 246 $g/ft^3$ (8.69 g/l) (substrate end b) and left it on (substrate end a). The results of this test are given in FIG. 3 as "Test C1 b".

d) The test described in b) was repeated with the exception that catalyst CC1 was used. The results of this test are given in FIG. 3 as "Test CC1".

e) FIG. 3 shows the THC emissions (weighted mg/mile) obtained in the tests C1 a, C1 b and CC1, respectively, Comparison Example 2

Comparison Example: 1 was repeated with the exception that 96 $g/ft^3$ (3.4 g/l) of palladium and 4 $g/ft^3$ (0.14 g/l) of rhodium were coated over the total length of the substrate.

Two of the obtained substrates were combined to form a catalyst system which is subsequently called CCS1.

Example 2

Catalyst CC1 was combined with catalyst C1 to form a catalyst system. The catalysts were arranged so that the exhaust gas first entered substrate end a of catalyst C1 and after having left catalyst C1 at substrate end b entered catalyst CC1. The catalyst system thus obtained is subsequently called CS1.

Example 3

Catalyst CC1 was combined with catalyst C1 to form a catalyst system. The catalysts were arranged so that the exhaust gas first entered catalyst CC1 and after having left it entered catalyst C1 at substrate end b. The catalyst system thus obtained is subsequently called CS2.

Comparison of CCS1, CS1 and CS2

Figure 4:
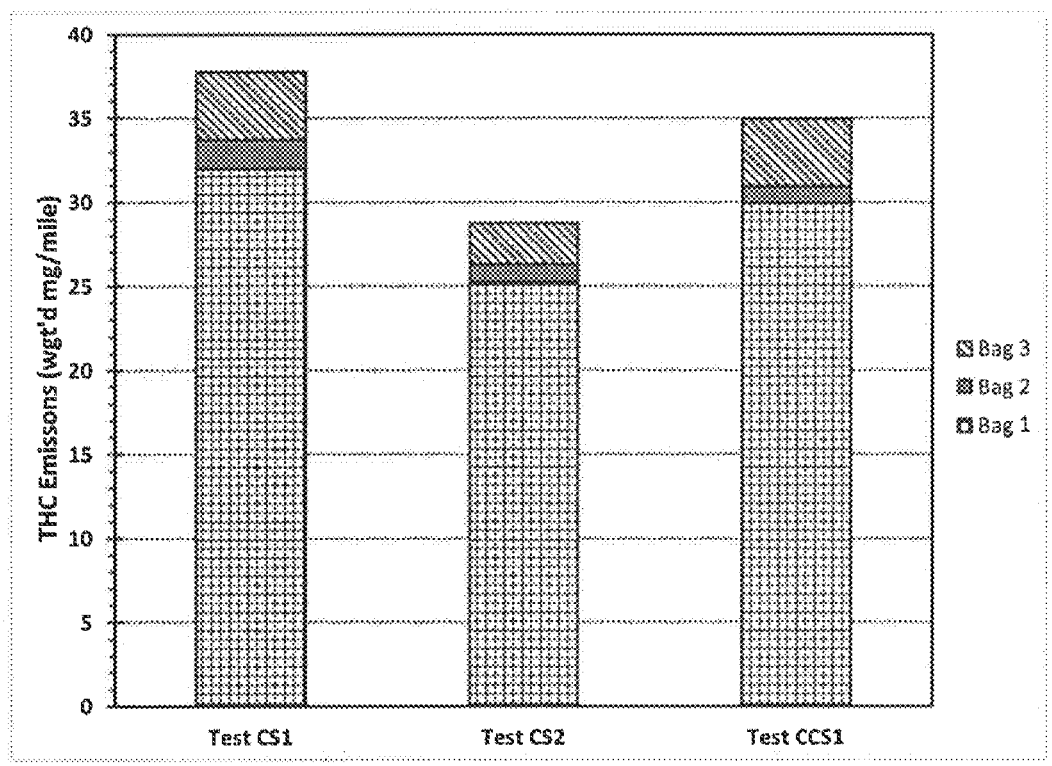
FIG. 4 shows the THC emissions (weighted mg/mile) thus obtained.

CCS1, CS1 and CS2 were aged and tested in line with the steps a) and b) above. FIG. 4 shows the THC emissions (weighted mg/mile) thus obtained.

The invention claimed is:

1. Catalyst comprising a carrier substrate of the length L extending between substrate ends a and b and two washcoat zones A and B, wherein
    washcoat zone A comprises a first platinum group metal and extends starting from substrate end a over a part of the length L, and
    washcoat zone B comprises the same components as washcoat zone A and in addition a second platinum group metal and extends from substrate end b over a part of the length L,
    wherein $L=L_A+L_B$, wherein $L_A$ is the length of washcoat zone A and $L_B$ is the length of substrate length B, and wherein the predominant or only second platinum group metal content in washcoat zone B is represented by either palladium, rhodium or a combination of palladium and rhodium, and
    wherein the first platinum group metal is predominantly or only palladium and rhodium and the predominantly or only second platinum group metal is palladium.

2. Catalyst according to claim 1, wherein the first and second platinum group metals are or different.

3. Catalyst comprising a carrier substrate of the length L extending between substrate ends a and b and two washcoat zones A and B, wherein
    washcoat zone A comprises a first platinum group metal and extends starting from substrate end a over a part of the length L, and washcoat zone B comprises the same components as washcoat zone A and in addition a second platinum group metal and extends from substrate end b over a part of the length L, wherein $L=L_A+L_B$, wherein $L_A$ is the length of washcoat zone A and $L_B$ is the length of substrate length B, and wherein washcoat zone A comprises two layers A1 and A2, which both extend over the length $L_A$, wherein layer A1 comprises a first platinum group metal and layer A2 comprises a first platinum group metal different from the first platinum group metal of layer A1 and washcoat zone B comprises two layers B1 and B2, which both extend over the length $L_B$, wherein layer B1 comprises the same components as layer A1 and layer B2 comprises the same components as layer A2 and wherein layers B1 and B2 comprise in addition a second platinum group metal.

4. Catalyst according to claim 3, wherein the first platinum group metal in layer A1 is palladium and/or rhodium and the first platinum group metal in layer A2 is rhodium.

5. Catalyst according to claim 3, wherein the first platinum group metal in layer A1 is palladium and rhodium and the weight ratio Pd:Rh is 10:1 to 1:10.

6. Catalyst according to claim 1, wherein the first and second platinum group metals are independently from each other supported on a carrier material.

7. Catalyst according to claim 6, wherein the carrier material is selected from the group consisting of alumina, silica, magnesia, titania, zirconia, ceria, mixtures comprising at least two of these materials and mixed oxides comprising at least two of these materials.

8. Catalyst according to claim 1, wherein the carrier substrate of the length L is a flow-through or filter substrate.

9. Catalyst according to claim 1, wherein washcoat zone B is free of platinum.

10. Catalyst system comprising a first three-way catalyst according to claim 1 and a second three-way catalyst.

11. Catalyst system according to claim 10, wherein the first three-way catalyst is followed by the second three-way catalyst, and the second three-way catalyst has a different catalyst composition than the first three-way catalyst.

12. Catalyst system according to claim 10, wherein the first three-way catalyst follows the second three-way catalyst, and the second three-way catalyst has a different catalyst composition than the first three-way catalyst.

13. Method of treating exhaust gases of a combustion engine, wherein the exhaust gas is passed over the catalyst of claim 1, wherein it enters the catalyst at substrate end a and exits it at substrate end b.

14. Method according to claim 13, wherein the catalyst is arranged in close coupled position.

15. Catalyst comprising a carrier substrate of the length L extending between substrate ends a and b and two washcoat zones A and B, wherein washcoat zone A comprises a first platinum group metal and extends starting from substrate end a over a part of the length L, and washcoat zone B comprises the same components as washcoat zone A and in addition a second platinum group metal and extends from substrate end b over a part of the length L, wherein $L=L_A+L_B$, wherein $L_A$ is the length of washcoat zone A and $L_B$ is the length of substrate length B, and wherein washcoat zone A extends over 70 to 95% of the length L of the carrier substrate and washcoat zone B extends over 5 to 30% of the length L of the carrier substrate.

16. Catalyst according to claim 15, wherein the first platinum group metal is predominantly or only platinum, palladium and/or rhodium and the predominant or only second platinum group metal is palladium or rhodium.

17. Catalyst according to claim 15, wherein the first platinum group metal is predominantly or only palladium and rhodium and the predominantly or only second platinum group metal is palladium.

18. Catalyst according to claim 15, wherein only rhodium represents the second platinum group metal in washcoat zone B.

19. Catalyst according to claim 15, wherein only rhodium and palladium represent the second platinum group metal in washcoat zone B.

20. Catalyst according to claim 15, wherein only palladium represents the second platinum group metal in washcoat zone B.

21. Method for the manufacturing of a catalyst according to claim 15 by a two-step process which comprises coating of the carrier substrate with a coating suspension (washcoat) which contains the components of washcoat zone A over its entire length L and dipping the coated carrier substrate in a aqueous solution containing a water soluble compound of the second platinum group metal until a length which corresponds with the length of washcoat zone B, so as to form washcoat zone B.

\* \* \* \* \*